United States Patent [19]

Miller

[11] Patent Number: 4,951,708

[45] Date of Patent: Aug. 28, 1990

[54] VACUUM CHECK VALVE

[75] Inventor: James W. Miller, Xenia, Ohio

[73] Assignee: General Motors Corporation, Detroit, Mich.

[21] Appl. No.: 277,629

[22] Filed: Nov. 30, 1988

[51] Int. Cl.⁵ ............................................. F16K 15/06
[52] U.S. Cl. .................................... 137/526; 137/542
[58] Field of Search .................. 137/526, 533.25, 542, 137/543

[56] References Cited

U.S. PATENT DOCUMENTS

| 1,530,924 | 3/1925 | Biedermann | 137/533.25 |
| 2,148,850 | 2/1939 | Deakins | 137/533.25 X |
| 4,556,084 | 12/1985 | Frawley | 137/526 |
| 4,643,221 | 2/1987 | Parker | 137/526 X |

Primary Examiner—Robert G. Nilson
Attorney, Agent, or Firm—Ernest E. Helms

[57] ABSTRACT

Resilient accommodation of vacuum brake booster check valves to vacuum source-generated pressure pulses tending to cause the valves to pulse open and close is accomplished by providing a resilient annular area in the check valve radially between its axial center and the area where it sealingly engages a valve seat when closed to inhibit valve pulsations and resulting valve noises generated by pulsations from the vacuum source.

10 Claims, 1 Drawing Sheet

VACUUM CHECK VALVE

Cross References to Related Patents and Applications

The invention is an improvement on the vacuum check valve of U.S. Pat. No. 4,628,959 entitled "Vacuum Check Valve", filed Aug. 30, 1985, issued Dec. 16, 1986 and assigned to the common assignee. It also relates to the inventions disclosed and claimed in U.S. patent application Ser. No. 909,738, entitled "Vacuum Check Valve" and filed Sept. 19, 1986, now U.S. Pat. No. 4,724,867 issued Feb. 16, 1988; and U.S. Pat. No. 4,763,689, entitled "Vacuum Check Valve" issued Aug. 16, 1988; both of which are also assigned to the common assignee.

Field of the Invention

The invention relates to a vacuum check valve and more particularly to such a valve used in the vacuum supply line as a control for a vacuum suspended brake booster supply. The valve assembly embodying the invention herein disclosed and claimed inhibits pulsation of the valve member as the vacuum pressures change due to air flow pulsations occurring in the vacuum source, particularly when that source is the intake manifold of an internal combustion engine. When valve pulsations are inhibited, the generation of undesirable valve noises is also inhibited.

Description of Related Art

Vacuum check valves of the type disclosed in U.S Pat. No. 3,086,544, entitled "Check Valve" and issued Apr. 23, 1963, have been used with vacuum suspended power brake boosters for many years. The typical valve construction of this type has a valve element positioned in a valve chamber and made essentially of a washer and a rubber element. The valve is contained and guided within the chamber by the chamber side wall in relation to the outer periphery of the washer. A spring in the valve chamber urges the valve element toward engagement with an annular ridge which forms a valve seat around the point of entry of the inlet conduit into the valve chamber. Since air flow must pass around the valve when it is open, the guiding function of the chamber side wall permits some valve lateral movements so that the valve may not always be completely axially aligned with the valve seat. This minor misalignment presented no problem with small leaks that occasionally occurred when used with larger engines. However, as vehicle engines have been made smaller to achieve a higher fuel economy, less vacuum is available to operate various vehicle accessories than was the case with most vehicle engines when such check valves began to be used.

The improved vacuum check valve of U.S. Pat. No. 4,628,959 in which the invention is preferably incorporated is a guided poppet valve having a valve stem extending through valve housing guide means. The poppet valve is reinforced for improved sealability. The valve member seal which is engageable with the valve seat is made of a material which substantially eliminates cold weather sticking. It minimizes the formation of ice crystals between the valve seal and the valve seat so that leakage of air past the valve does not normally occur, even in extremely cold weather. The material is also of a type that has improved fuel resistance. By guiding the valve poppet with a valve stem located along the valve poppet axis, greater clearance is able to be maintained between outer periphery of the valve poppet and the adjacent inner wall of the valve housing, permitting much higher air flow rates which are subject to substantially less restriction to flow. At the same time, the valve is maintained in proper guided relation to the valve seat, assuring full circumferential section and sealing. This type of valve has now been accepted and is in production use with a large portion of the vacuum boosters made in the United States of America.

In the vacuum check valve of U.S. Pat. No. 4,763,689 noted above, the valve member is laterally biased by a resilient O-ring type spring element to cause a slight drag force to be exerted on the valve member which is sufficient to inhibit valve member pulsations while permitting proper valve operation. Other arrangements for inhibiting valve member pulsations by various side-loading means are disclosed in U.S. Pat. No. 4,724,867 also noted above.

Summary of the Invention

In the vacuum check valve herein disclosed and claimed, the several disclosed modifications are concerned with controlling the spring rate or stiffness of the poppet or valve member so that response of the poppet to engine air flow pulsations, which under some conditions excite the poppet and result in a vibration and noise problem, can be eliminated.

One arrangement decreases the diameter of the poppet valve disc so that the valve member seal section has more rubber or rubber-like material not directly supported in line with the valve disc. This increases the flexibility of the disc/seal assembly. The other arrangements decrease the thickness or other aspects of the valve disc between the valve guide stem and the annular valve member seal to modify the spring rate of the valve disc. All of these arrangements decrease the sensitivity of the valve member to forces which contribute to valve member pulsations, thus inhibiting such pulsations.

Description of the Preferred Embodiments

Figure 1:
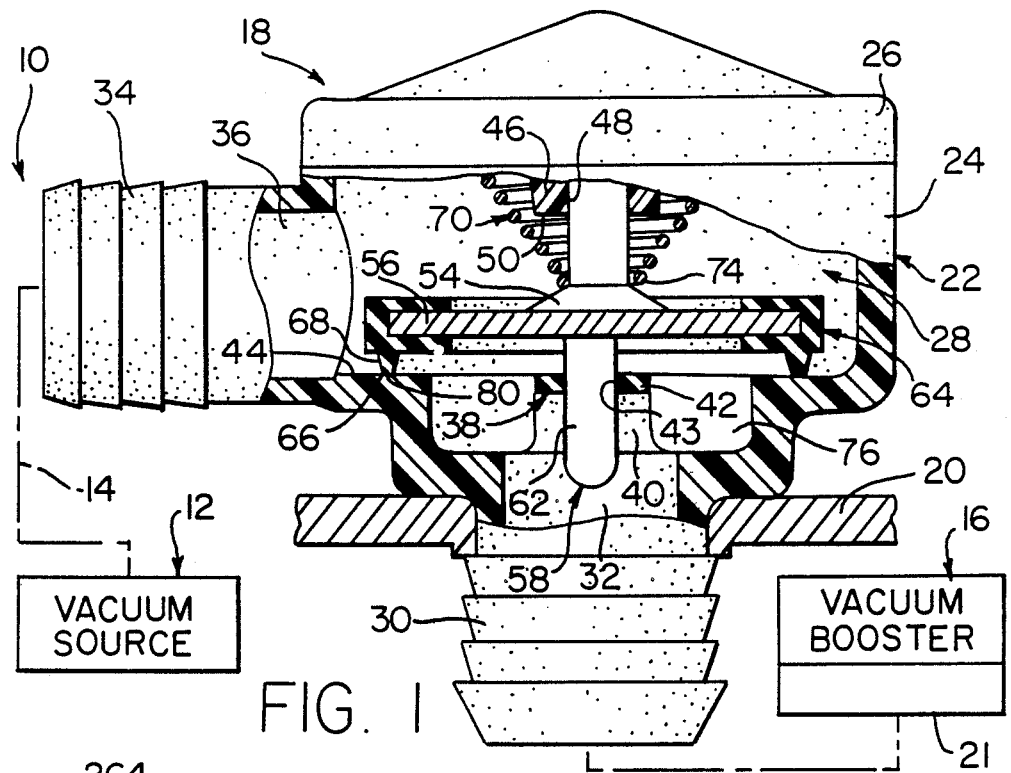
FIG. 1 is a cross-section view, with parts broken away, illustrating a prior art vacuum check valve as disclosed in one or more of the patents and patent applications noted above.

The system 10 shown in FIG. 1 includes a vacuum source 12 which is preferably an engine intake manifold. As is well known, the intake manifold of an internal combustion engine is commonly used as a source of vacuum to supply vacuum pressure to certain accessories, particularly in motor vehicles. A suitable connection 14 is provided to tap into the intake manifold and obtain vacuum therefrom.

A vacuum suspended brake booster servomotor 16 may be the device with which a check valve embodying the invention is used, as more fully disclosed in the above noted patents. The servomotor has a vacuum check valve assembly 18 which is preferably mounted on the servomotor housing front section 20 and is schematically illustrated in FIG. 1 as opening at the valve inlet side into the servomotor vacuum chamber 21. The outlet side of the vacuum check valve assembly 18 is connected by the vacuum connection 14 to the intake manifold vacuum source 12.

An example of a typical servomotor, with a more detailed description of its operation, is found in U.S. Pat. No. 3,249,021, issued May 3, 1966 and entitled "Power Brake Booster".

The vacuum check valve assembly 18 of FIG. 1 is the assembly disclosed and claimed in U.S. Pat. No. 4,628,959 noted above. A detailed description of that valve assembly follows so that the improvements to that valve assembly which are herein disclosed and claimed may be fully understood.

Valve assembly 18 includes a housing 22 formed of housing sections 24 and 26. Housing section 26 is sealingly secured to housing section 24 somewhat like a cover and cooperates with housing section 24 to define a valve chamber 28. An inlet 30 is integrally formed with housing section 24. The inlet is constructed to also provide means to secure the valve assemblY to the booster housing front section through a booster housing front section opening in sealing relation, as is well known in the art. It also has an inlet passage 32 formed therethrough.

An outlet 34 is also formed as a part of housing section 24. It has an outlet passage 36 formed therethrough and is arranged to receive vacuum connection 14 in sealing relation to provide communication between the valve outlet 34 and the vacuum source 12. The inlet and outlet passages 32 and 36 each connect with the valve chamber 28.

Housing section 24 also has a web 38 formed therein over the inlet passage 32, the web being provided with web openings 40 which provide a substantially unrestricted fluid flow connection from the inlet passage 32 into the valve chamber 28. Web 38 has a center part 42 which is in axial alignment with the inlet passage 32. An opening 43 is formed axially through the web center part 42 so that the web center part forms a guide for the valve member to be described.

An annular valve seat 44 is defined by a surface formed as a part of housing section 24 and generally defining an end wall of the valve chamber 28 together with web 38. The surface of web center part 42 facing toward the main portion of the valve chamber 28 may be a planar extension of the surface defining the annular valve seat 44.

Valve housing section 26 is provided with a boss 46 extending into the valve chamber 28. Boss 46 has a recessed opening 48 formed therein and opening into the valve chamber 28. Opening 48 is in axially spaced alignment with the web opening 43. Boss 46 has a spring seat (not shown) formed around its base and providing a spring seat for the valve spring to be described, as is more fully shown in the patents and patent applications noted above. The end 50 of boss 46 terminates in spaced relation to the web center part 42. Recessed opening 48 also acts as a guide for a portion of the valve member to be described.

The check valve member 52 of FIG. 1 is a poppet type of check valve contained within the valve chamber 28. Valve member 52 has a rigid valve member body 54 formed to include a disc-like center section 56 and a valve stem 58. Valve stem 58 includes a first valve stem portion 60 extending axially from one side of the center section 56 and forming a first guided valve portion which is reciprocably received and guided by recessed opening 48 of housing section 26. The valve stem also includes a second valve stem portion 62 extending axially from the other side of the valve member center section 56 and forming a second guided valve portion. Valve stem portion 62 extends through the web opening 43 for guided reciprocal movement therein. One of the valve stem portions is larger in diameter than the other, and the same is true of the openings 43 and 48, thereby preventing the valve member 52 from being accidentally assembled in the axially reversed position from that desired. For this purpose it is preferred that the valve stem portion 62 and web opening 43 have a smaller diameter than that of the valve stem portion 60 and the recessed opening 48. Since the usual manner of assembly of the valve in the housing would be to first insert stem portion 62 through web opening 43, it is clear that the larger valve stem portion 60 could not be so inserted because web opening 43 is smaller in diameter than that valve stem portion. This effectively prevents misassembly of the valve member in the housing.

Valve member 52 has an annular valve member seal 64 secured to the peripheral portion of the disc-like center section 56 of the valve body 54 and extending radially therebeyond. One side of the annular valve member seal 64 has a valve seat-engageable surface 66 defined by the outer end of a circumferentially formed valve member bead 68 which extends axially from the main part of the valve member seal 64 so as to be engageable with the annular valve seat 44 of housing section 56. A compression coil valve spring 70 is received in valve chamber 28. It has one spring end (not shown) engaging the above described spring seat formed as a part of housing section 26. The other spring end 74 engages one side of the valve member body 54 so that the valve member 52 is continually urged toward surface sealing engagement with the annular valve seat 44. Valve spring 70 is so proportioned, and the axial distance between the end 50 of boss 46 relative to the facing surface of the valve member body 54 is such, that the valve member body may move against the force of the spring 70 to fully open the valve by separating the valve member bead 68 from the annular valve seat 44 a sufficient axial distance to provide substantially no flow restriction past the bead and valve seat. At the same time, valve stem portion 62 remains guided within the web opening 43 and valve stem portion 60 moves further into the recessed opening 48. The rigid valve member body 54 extends radially outward so that it is axially aligned with the major portion of the valve member bead 68 to provide reinforcement for the entire valve member seal 64 and axial stability for the valve member bead 68. The guiding actions of openings 43 and 48 on stem portions 62 and 60, respectively, further assure the maintenance of the sealing surface 66 of the valve member seal 64 in parallel planar relation with the valve seat 44 a all times.

When the valve member bead 68 is in sealing engagement with seat 44 as shown in FIG. 1, the valve chamber 28 is separated into a chamber inlet section 76 and a chamber outlet section 78. Chamber inlet section 76 is in fluid communication with the inlet passage 32 so that the entire surface area of the valve member 52 positioned radially inward of the seat engageable surface 66 is exposed to pressure within inlet passage 32 and therefore to the pressure in the vacuum chamber 21 of the booster 26. The chamber outlet section 78 is in full fluid communication with the outlet passage 36 at all times, and the pressure therein is the pressure being transmitted to the check valve assembly 16 from the engine vacuum source 12 through vacuum connection 24. This pressure also acts on the valve member 52 across the same effective surface as that described immediately above for the inlet pressure. It also acts on the small annular seal-engaging seat surface area 80 which is defined by the seat area throughout which valve member seal bead surface 66 is in surface engagement with the annular valve seat 44 when the valve is in the closed position. Therefore the pressure acting on valve member 52 and contained within chamber outlet section 78 acts over a slightly larger effective area than does the inlet pressure acting in the chamber inlet section 76 on the effective area of valve member 52. This difference in effective areas is maintained at a minimal amount by keeping the area of surface 80 to a minimal amount. Therefore the valve will remain closed so long as the absolute pressure acting in chamber 78 is greater than, or substantially equal to, the absolute pressure acting in chamber 76. Because the spring force exerted by spring 70 is light, the valve will be moved axially to its open position when the absolute pressure in chamber 76 only slightly exceeds the absolute pressure in chamber 78. The minimal contact area is also important in preventing the valve from sticking during extremely cold conditions, as will be further described.

The valve member seal 64 of the construction shown in FIG. 1, and the valve member seals of the other Figures, are preferably molded in place on the valve member body. It has been found that it is also preferable to make the valve member seals from a fluoro-silicone rubber for improved fuel vapor resistance and minimization of cold weather sticking. The material should have a durometer of about 40 to 50 at a standard temperature of 70° F., and should increase in durometer with a decrease in ambient temperature to no more than about 60 to 70 durometer at about minus 10° F. This will not only substantially eliminate cold weather sticking of the valve seal to the valve seat under cold weather conditions, but will also maintain good sealing characteristics throughout the range of temperatures normally encountered in vehicles, such a temperature range being from as high as about 280° F. in the engine compartment in which the valve is normally located to as low as about minus 40° F.

By arranging the valve member so that it is guided and supported axially, greater clearance around the outer periphery of the valve member in relation to the valve housing is permitted so to minimize flow restriction in that area. It is preferred that the annular area defined by the outer periphery of the valve member and the portion of the valve housing which is radially outward of the valve member outer periphery be at least as great as the effective cross-section area of the inlet port formed by inlet 62. This assures a substantially unrestricted air flow past the outer periphery of the valve member when the valve assembly is open. A considerably greater air flow may be obtained through the valve than has heretofore been the case. This therefore leads to an increase in the size of vacuum hose such as the hose providing the vacuum connection 24, as well as the sizes of the inlet passage 32 and the outlet passage 36, to take full advantage of the decrease in restriction to flow in the valve itself. This has resulted in substantially less pressure drop in relation to flow rate, minimizing the amount of time required to reestablish the desired vacuum pressure in the vacuum chamber of the brake booster during or after booster operation. At the same time, the average differential pressure for opening the vacuum check valve is maintained at less than one inch of mercury. Where the average flow restriction at a flow rate of 500 cubic feet per hour of air through the valve has previously been in the range of about 18 to 28 inches of mercury, each of the valves as shown in the Figures has an average flow restriction at this flow rate of less than 3 inches of mercury.

The valve has also minimized the amount of leakage when the valve is supposed t be fully closed. Valves like those of FIG. 1 have been equal to the best of valves in current production at moderately high temperatures. For example, at 212° F., tests have indicated that no leakage has occurred, while on some production units using other valve designs, as much as 10% of the valves will have some leakage at this temperature.

The valves shown in the drawing have also considerably decreased the valve leakage at cold temperatures, as well as valve sticking under cold temperatures. For example, the valve illustrated in FIG. 1 had no leaks and did not stick at 0° F. The valve also showed dramatic improvement in leakage and potential failure with a pressure differential thereacross as small as 2 inches of mercury and up to 20 inches of mercury, in comparison to various valves used by different manufacturers.

It has been found that in some installations the valve of U.S. Pat. No. 4,628,959 referred to above, would pulsate and generate disagreeable valve noises. Experience indicated that this has occurred when used with some engines but not with others. It involves the air flow pulsations set up in the intake manifold, particularly at certain engine speeds, and has been more noticeable with engines having fewer cylinders, e.g., four, than those with more cylinders, e.g., eight. It also appears to depend on other factors and conditions where such pulsations may sympathetically reinforce each other and operate at frequencies to which the valve member responds. While not being an adverse operational problem, the noises generated by the valve pulsations are objectionable.

As disclosed and claimed in certain of the other noted patents and applications, a side-load bias has been found to be helpful in preventing the valve from being excited by the engine air flow pulsations so that it also pulses.

In some instances, it is considered preferable to use no such side loading, but still provide means which will obviate the occurrence of undesirable pulsations of that type. Therefore it is an object of the invention herein disclosed and claimed to inhibit such pulsations and therefore inhibit the generation of such undesirable valve noises by controlled flexibility of the valve member which will absorb minor pulsations without pulsingly opening and closing the valve.

Figure 2:
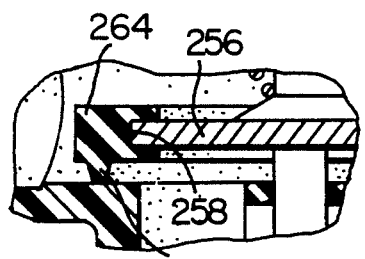
FIG. 2 is a fragmentary cross-section view, with parts broken away, illustrating the vacuum check valve embodying one arrangement of the invention, as incorporated in the vacuum check valve of FIG. 1.

One such embodiment is illustrated in FIG. 2. In this embodiment the outer periphery 258 of the valve disc 256 is of less diameter than the diameter of the outer periphery of the valve disc 56 of FIG. 1 to the extent that the valve disc 256 does not give direct axial support to the valve seal bead 268, but is radially inwardly spaced therefrom. This requires additional rubber in the valve member seal 264 as compared to that forming valve seal 64 in the structure of FIG. 1. This reduces the stiffness of the poppet valve in an annular area radially outward of the disc center but radiallY inward of the valve seal bead 268, allowing it to flex so that its guide stem and disc can move slightly axially, in response to air flow pulsations received from the engine intake manifold, while the seal remains in sealing engagement with its seat. This arrangement therefore functions to inhibit the valve pulsations when they might occur and therefore acts to inhibit the generation of undesirable valve noises, but does not rely on side-load damping.

Figure 3:
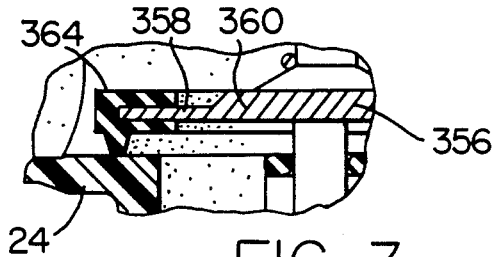
FIG. 3 is another fragmentary cross-section view, with parts broken away, illustrating another modification to the vacuum check valve of FIG. 1 so as to embody the invention.

The embodiment of FIG. 3 has the disc 356 of the valve of about the same diameter relative to the valve member seal 364 as is the disc 56 relative to its valve seal 64 in FIG. 1. However, the outer annular part 358 of disc 356 is substantially thinner than the inner part 360 so that the disc outer annular part 358 is more flexible, with similar results to those obtained by the construction of FIG. 2. The thinner part 358 preferably extends radially inward from the periphery for about half of the radius of the disc. However, this distance, and the actual thickness of part 358, may be modified so as to obtain the desired results with the particular engine and system installation.

Figure 4:
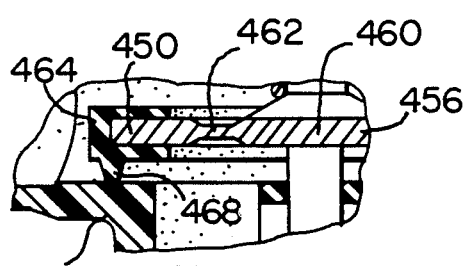
FIG. 4 is similar to FIG. 3 and illustrates still another modification embodying the invention.

The embodiment of FIG. 4 has the disc 456 of the valve of about the same diameter relative to the valve seal bead 468 as does the disc 56 relative to its valve seal bead 68 in FIG. 1. In this instance an intermediate annular part 462 of disc 456 is substantially thinner than the disc inner part 460 or the disc outer annular part 450. This also renders the disc more flexible, inhibiting valve pulsations which may occur.

Figure 5:
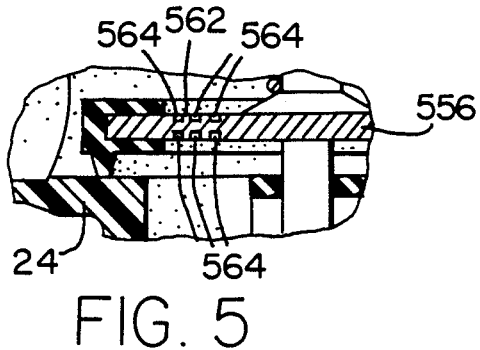
FIG. 5 is also similar to FIG. 3 and illustrates another modification embodying the invention which is closely related to the modification shown in FIG. 4.

The embodiment of FIG. 5 is closely related to that of FIG. 4, with the intermediate annular part 562 of the disc 556 being formed with a plurality of radially spaced grooves 564, or a spiral groove which will give a similar effect, to provide the requisite added flexibility of intermediate annular part 562.

The illustrated and claimed invention provides arrangements which effectively inhibit valve pulsations when they are likely to occur because of pressure differential changes at either the inlet or outlet port or both, and therefore inhibit undesirable valve noises generated as a result of such pulsations.

The embodiments of the invention in which an exclusive property or privilege is claimed are defined as follows:

1. In a vacuum check valve assembly for a vacuum powered brake booster having:
    a housing having a valve chamber formed therein, an inlet opening adapted to be connected to a vacuum powered brake booster, an outlet opening adapted to be connected to a source of vacuum pressure;
    a check valve in said valve chamber having a normal closed position preventing vacuum communication between said outlet and said inlet and an open position permitting vacuum communication between said outlet and said inlet;
    said check valve having an axially guided center disc including a disc body having a center and an annular rubberlike valve portion on the outer peripheral part of said disc body which sealingly engages said housing when said valve is in the normal closed position and is spaced from said housing to permit air to flow therepast when said valve is in the open position;
    the improvement comprising;
    said check valve center disc having a flexible portion of said disc body radially intermediate the area of sealing engagement of said center disc annular rubberlike valve portion with said housing and said center of said disc body, said flexible portion being formed by an annular less thick portion of said disc body than the part of said disc body radially inward of said flexible portion, said flexible portion acting when said valve is in said normal closed position to permit slight axial movements of said disc body in response to pressure pulsations generated by said source of vacuum pressure without unsealing said rubberlike valve portion from said housing.

2. In a check valve for a vacuum powered brake booster having:
    a housing having a valve chamber formed therein, an inlet opening adapted to be connected to a vacuum powered brake booster, an outlet opening adapted to be connected to a source of vacuum pressure, and a check valve assembly in said valve chamber having a normally closed position preventing vacuum communication between said outlet opening and said inlet opening and an open position permitting vacuum communication between said outlet opening and said inlet opening;
    said valve having a center disc and an annular rubberlike valve portion which sealingly engages said housing when said valve is in the normally closed position and is spaced from said housing to permit air to flow therepast when said valve is in the open position; the improvement comprising:
    said valve center disc having a thinner section positioned radially between the disc center and the disc periphery, said thinner section providing a spring-like action at a lower force level than would be the case if said valve center disc were of substantially constant thickness from the disc center to the disc periphery.

3. In a vacuum check valve assembly for controlling vacuum fluid pressure in a container, said check valve assembly having: a housing;
    a valve chamber in said housing defined by opposed end walls and a side wall formed as a part of said housing;
    an inlet port and an outlet port formed in said housing and respectively opening through different ones of said walls so as to be in fluid communication with said valve chamber, said inlet port being adapted to be connected to a container in which vacuum fluid pressure is to be normally retained and said outlet port being adapted to be connected to a source of vacuum fluid pressure;
    an annular valve seat formed as a part of one of said housing end walls about said inlet port;
    a valve member movably mounted in said valve chamber and having a disc-like valve element in radially inwardly spaced relation to said chamber side wall, said valve member disc-like valve element having an annular peripheral portion, an inner portion, a valve element center, and a rubberlike valve portion secured on the annular peripheral portion;
    said valve member further having valve stem means extending axially from said disc-like valve element;

said housing having valve stem-receiving guide means formed in said opposed end walls limiting the movements of said valve member to movements axially of said valve stem means and said disc-like valve element and toward and away from said annular valve seat to close said inlet port in one position and to open said inlet port and permit fluid flow around said disc-like valve element through said valve chamber and into said outlet port;

and a valve spring axially biasing said valve member toward said annular valve seat;

the improvement comprising:

said valve member disc-like valve element having at least one section positioned radially between the outer periphery of said annular peripheral portion and said valve element center and positioned in radially outward spaced relation to said valve element center, said at least one section being substantially thinner in thickness than the thickness of said valve element between said valve element center and said section, said at least one thinner section providing a spring-like action at a lower force level than would be the case if said valve element were of substantially constant thickness from said center to the outer periphery of said annular peripheral portion.

4. The invention of claim 3 in which said at least one thinner section extends to the outer periphery of said annular peripheral portion.

5. The invention of claim 3 in which said at least one thinner section is located radially inward of said rubber-like valve portion.

6. The invention of claim 3 in which said at least one thinner section comprises a series of radially spaced grooves located on at least one side of said valve element.

7. The invention of claim 6 in which said grooves are concentric grooves.

8. The invention of claim 6 in which said grooves are formed by at least one spiral groove.

9. The invention of claim 6 in which said grooves are located on both sides of said valve element.

10. The invention of claim 9 in which said grooves on one side of said valve element are aligned with said grooves o the other side of said valve element so that the thinner sections are defined by the disc element material between the bottoms of said grooves.

* * * * *